United States Patent [19]

Isukamoto et al.

[11] 3,960,787

[45] June 1, 1976

[54] PROCESS FOR PREPARING FOAMABLE SYNTHETIC RESIN GRANULES

[75] Inventors: Hiroji Isukamoto, Osaka; Hisashi Morikawa, Takasago; Masao Nakagawa, Takasago; Shinji Kato, Takasago; Masaki Miyamoto, Yokohama; Toichiro Yoda; Katsuhiko Yoshihara, both of Ibaragi, all of Japan

[73] Assignee: Kanegafuchi Kagaku Kogyo Kabushiki Kaisha, Osaka, Japan

[22] Filed: June 6, 1974

[21] Appl. No.: 476,823

Related U.S. Application Data

[63] Continuation of Ser. No. 299,902, Oct. 24, 1972, abandoned.

[30] Foreign Application Priority Data

Oct. 25, 1971  Japan.................................. 46-84903

[52] U.S. Cl.......................... 260/2.5 B; 260/2.5 HB; 260/32.6 R; 260/874

[51] Int. Cl.².......................... C08J 9/02; C08K 5/20; C08L 25/06

[58] Field of Search.................................. 260/2.5 B

[56] References Cited
UNITED STATES PATENTS

| | | | |
|---|---|---|---|
| 2,983,692 | 5/1961 | D'Alelio........................... | 260/2.5 B |
| 3,389,097 | 6/1968 | Ingram et al..................... | 260/2.5 B |

OTHER PUBLICATIONS

Hohenstein et al., "Polymerization of Olefins and Diolefins in Suspension and Emulsion, Part I", J.P.O.S., vol. 1, No. 2 (1946), pp. 127–145.

*Primary Examiner*—Murray Tillman
*Assistant Examiner*—Thurman K. Page
*Attorney, Agent, or Firm*—Moonray Kojima

[57] ABSTRACT

In a process for preparing foamable synthetic resin granules by suspension polymerization, a fatty acid bisamide is added prior to or at an early stage of polymerization in the presence of an inorganic salt and a foaming agent is added at a later stage of polymerization or after completion thereof.

13 Claims, No Drawings

PROCESS FOR PREPARING FOAMABLE SYNTHETIC RESIN GRANULES

This is a continuation of application Ser. No. 299,902, filed Oct. 24, 1972, now abandoned.

BACKGROUND OF THE INVENTION

The present invention relates to a process for preparing improved foamable synthetic resin granules by suspension polymerization.

The present commercial foamable synthetic resin granules, such as foamable styrene resin, have one or more of the following disadvantages:

I. Cells in a section of foamed resin granules are very coarse, when the resin granules are foamed immediately after preparation. A period of aging for several days or one month is necessary.

II. Cells in a section of foamed resin granules are very coarse, when the resin granules are foamed after being exposed to high temperatures.

III. Cells in a section of foamed resin granules are very coarse, when the foamable resin granules are kept (without foaming) until fine cells become obtainable in foamed resin granules, and then are exposed to high temperatures, such as those of the summer season, and then the resin granules are foamed.

IV. Resin granules are prone to cause blocking in a foaming machine.

V. A long time is required to cool a molded shaped article heated in a die, when foamed resin granules are poured into a large die to obtain a special large molded shaped article.

SUMMARY OF THE INVENTION

It is an object of the present invention to improve the above disadvantages of the conventional foaming styrene synthetic resin granules.

The present invention encompasses a process for preparing novel foamable synthetic resin granules by water suspension polymerization of a resin, such as styrene, styrene derivative or monomer mixture containing 50% or more of styrene, wherein a small amount of inorganic salts and fatty acid bisamide are added to the polymerization system prior to polymerization or at an early stage of polymerization, and wherein one or more foaming agents, which are gaseous under normal condition, are added to the polymerization system toward the later stage thereof or after the completion of the polymerization, thereby to prevent the adhesion of foaming styrene resin granules to each other.

DETAILED DESCRIPTION OF INVENTION

Advantageously, the foamable resin granules formed by this inventive process have such properties as uniformity and fineness, despite any temperature change, less adhesion during molding and reduced time of molding.

As raw materials, the following substances may be used: Polymers or copolymers of styrene resins such as styrene, styrene derivatives containing alpha methyl styrene, etc., which contain 50% or more of styrene. Other resins which may be later used to form foamable products may also be used.

Styrene or styrene derivatives can be mixture polymerized or copolymerized with esters or acrylic or methacrylic acid such as methyl acrylate, butyl acrylate, etc., or acrylonitrile, methacrylonitrile, butadiene, etc. Other monomers may be used where appropriate. Mixtures of the foregoing may be used.

As foaming agents, compounds which are gaseous under normal conditions may be used. For example, such agents may be lower aliphatic hydrocarbons such as ethane, propane, butane, isobutane, putene, pentane, etc., or freon, dimethyl ether, methyl chloride, etc. Mixtures of the foregoing may be used Compounds which are not gaseous as simple substances under normal conditions, but becomes gaseous under 1 atmosphere at temperatures prevailing during the summer season can also be used as foaming agents for the purposes of this invention. Such compounds include butane containing a small amount of pentane, etc. It is known that uniform cells can not be obtained in foamed resin granules with the use of liquid foaming agents alone, when resin granules are foamed immediately after preparation. The amount of liquid foaming agents to be added should be from about 1.5 to about 15 weight percent of the resins as raw material.

These foaming agents can be added to the polymerization system in the latter half of polymerization or after the completion of polymerization. Generally speaking, it is not desirable to add foaming agents to the polymerization system at the first half stage of polymerization. As dispersing (or sometimes called suspension) agents for suspension polymerization organic or inorganic dispersing agents, such as polyvinyl alcohol or calcium phosphate, etc may be used.

The inorganic salts to be added to water may include sulfates, such as potassium sulfate, ammonium sulfate; phosphates, such as, sodium tripolyphosphate, etc. The amount of inorganic salts to be added should be from about 0.1 to about 3.0 weight percent. It is well known that inorganic salts are often added to polymerization systems at the early stage of polymerization to increase the stability of suspension. However, when fatty acid bisamide is added to the polymerization system, the stability of suspension at the early stage of polymerization lowers, and at the same time resin granules adhere to each other with the addition of foaming agents. It is not known in the prior art that inorganic salts are effective to prevent adhesion of resin granules.

The fatty acid bisamide, used in this invention, has the following formula:

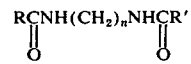

where, R and R' are alkyl group containing 7–23 carbon atoms, and $n$ is integral number, 1–6.

Examples of fatty acid bisamide are methylene bislauric acid amide, ethylene bisstearic acid amide, hexamethylene bispalmitic acid amide, ethylene bisoleic acid amide, etc. The amount of fatty acid bisamide which should be added to polymerization system is from 0.01 to 3.0 weight percent of the system. When more than 3.0% of fatty acid bisamide is added, the stability of suspension in the polymerization process lowers markedly, and at the same time, the moldability of the resulting resin granules is deteriorated. It is preferable to add fatty acid bisamide only or both of fatty acid bisamide and higher fatty acid to the polymerication system prior to or at an early stage of polymerization. When fatty acid bisamide is added to the polymerization system when the polymerization has proceeded to 15% or less, the cells in the resin granules foamed immediately after preparation become fine. More preferably, when the fatty acid bisamide is added when the polymerization has proceeded about 10% or less, the cells become more fine. As to higher acids, higher fatty acid containing 12–24 carbons, such as lauric acid, palmitic acid, myristic acid, stearic acid, oleic acid, etc., may be used.

Thus, the advantages of the present invention are as follows:

I. Cells in resin granules according to the present invention are uniform, fine, and close together when they are foamed immediately after preparation. A period of aging of resin before foaming is not necessary.

II. Cells in the foamed resin granules are always fine and close in spite of changes or normal temperatures.

III. The resin granules do not cause blocking upon foaming. Adhesion trouble in molding process, which take place due to the effect of fatty acid bisamide, is markedly less.

IV. Time required to cool a large die for large moldings can be diminished markedly.

The invention will now be further explained in connection with actual examples.

EXAMPLE 1

A. The following solutions and compounds were placed in a 1650 liters autoclave equipped with an agitator: 10 parts of an aqueous solution containing 0.3 part of polyvinyl alcohol (Gosenol GH 20 of Nihon Gosei Kagaku K.K.) as a dispersing (suspension) agent, 10 parts of aqueous solution of containing 0.1 part of sodium tipolyphosphate as inorganic salt, 20 parts of aqueous solution containing 0.004 part of sodium nitrite, 0.32 part of benzoyl peroxide, 0.03 part of perbenzoic acid-t-butyl, 0.3 part of ethylene bisstearamide and 100 parts of styrene. In the autoclave, polymerization started in nitrogen atmosphere at 90°C. When the degree of polymerization or rate (i.e. when the polymerization proceeded to) reach 25% a small amount of an aqueous solution of polyvinylalcohol was added to the autoclave. The aqueous solution of polyvinyl alcohol was again added to the autoclave 5 hours and 50 minutes after the beginning of polymerization. Then 9.5% of butane was also added and the polymerization system was heated to about 100°C and kept at that temperature for about 6 hours. When the heated polymerization system was cooled, dehydrated and dried, resin granule A was obtained.

B. The same experiment as (A) was performed except that 0.3 part of ethylene bisteamide was added to polymerization system when its degree of polymerization was 60%, and sodium tripolyphosphate was not employed. As a result, resin granules B were obtained.

C. The same experiment as (A) was performed, except that sodium tripolyphosphate was not employed.

D. The same experiment as (A) was performed, except that ethylene bisstearamide and sodium tripolyphosphate were not employed. That is to say, by the usual preparation method, resin granules (D) were obtained.

E. The same experiment as (A) was performed, except that instead of butane, pentane was used as a foaming agent.

Table 1, given below, shows the comparison of the properties of these resin granules.

F. The same experiment as (A) was performed, except that 0.3 part of ethylene bissteamide was added to the polymerization system when its degree of polymerization was 10%. As a result, resin granules (F) were obtained, and their properties were the same as properties of resin granules (A) and cells in section of foamed resin were fine, and blocking or agglomeration was not observed.

G. The same experiment as (A) was performed except that ethylene bissteamide was added to the polymerization system when its degree of polymerization was 15%. As a result, resin granules (G) were obtained, and their properties were the same as properties of resin granules (A) and cells in section were comparatively fine, and agglomeration was not observed.

H. The same experiment as (A) was performed except that ethylene bisamide was added to polymerization system when its degree of polymerization was 20%. As a result, resin granules (H) were obtained, and cells in section of foamed granules were coarse, and blocking of resin granules took place.

I. The same experiment as (A) was performed except that ethylene bisamide was added to polymerization system when its degree of polymerization was 50%. As a result, resin granules (I) were obtained, and cells in section of foamed granules were coarse, and blocking of resin granules took place.

J. The same experiment as (A) was performed except that 0.1 part of potassium sulfate was used instead of sodium tripolyphosphate. As a result, resin granules (J) were obtained, and cells in section of foamed granules were fine, and blocking of resin was not observed.

K. The same experiment as (A) was performed except that 0.2 part of calcium phosphate was used instead of sodium tripolyphosphate. As a result, resin granules (K) were obtained, and cells in section of foamed granules were fine, and blocking of resin was not observed.

Table 1

| Condition of resin granules | A | B | C | D | E |
|---|---|---|---|---|---|
| 1 resin granules just taken out from autoclave | Normal | Normal, but slight amount of white powder was observed in water in autoclave | no granules were obtained | normal | normal |
| 2 pre-foamed resin granules | No blocking | no blocking | — | blocking was observed | No blocking |
| 3 resin granules pre-foamed immediately after drying | Cells in section were fine | Cells in section were coarse | — | Cells were coarse | Cells were coarse |

Table 1-continued

| Condition of resin granules | A | B | C | D | E |
|---|---|---|---|---|---|
| 4 resin granules foamed after dried and kept for 3 hrs at 35°C | Cells were fine and close | Cells coarse | — | coarse | coarse |
| 5 Resin granules foamed after drying and then kept for 5 days at 10°C | Cells fine and close | Cells were nearly fine and coarse | — | nearly fine & close | cells coarse |
| 6 Resin granules foamed after keeping for 5 days at 10°C and then keeping 3 hrs at 35°C | Cells fine & close | cells coarse | — | coarse | coarse |
| 7 Required water cooling time (min) to take out molded articles out of a die of 60×90 ×50 cm into which pre-foamed resin granules were poured, and heated for 90 seconds under 0.5Kg/cm² of steam | 8 | 20 | — | 30 | 15 |
| 8 Inside adhesion degree (%) of said molded articles. | 70 | 20 | — | 70 | 60 |

EXAMPLE 2

L. 140 parts of an aqueous solution containing 0.3 part of potassium sulfate, 0.1 part of sodium tripolyphosphate, 0.004 part of sodium nitrite, and 0.3 part of polyvinyl alcohol were introduced into a 50 liters autoclave under agitation. 100 parts of styrene in which 0.3 part of methylene bisstearamide, 0.3 part of benzoyl peroxide and 0.03 part of perbenzoic acid-t-butyl were dissolved or dispersed, were added to the autoclave. Air in the autoclave was substituted by nitrogen. The autoclave was heated to about 90°C and polymerization started. Afterwards, 0.005 part of polyvinyl alcohol was added to the autoclave for one hour and continued polymerization. When polymerization degree reached 90%, aqueous solution containing 0.2 part of polyvinyl alcohol was added to the polymerization system. When polymerization rate reached 95%, 9.5 parts of foaming agent consisting of 92.5% of n-butane and 7.5% of isobutane were introduced into the polymerization system during 30 minutes under pressure. The polymerization system was heated to about 100°C during 60 minutes and kept at that temperature for about 6 hours. Afterwards, the resulting polymerized product was cooled, dehydrated and dried. As a result, resin granules (L) were obtained.

M. The same experiment as (L) was performed, except that methylene bisstearamide was not employed.

N. The following aqueous solution and compounds were introduced into the same autoclave as that of the experiment (L) under agitation: 140 parts of aqueous solution containing 0.3 part of polyvinyl alcohol as dispersing agent, 0.3 part of methylene bisstearamide, 0.3 part of benzoyl peroxide, 0.05 part of perbenzoic acid-t-butyl, and 100 parts of styrene.

After air in the autoclave was substituted by nitrogen, the autoclave was heated. Then the stability of suspension lowered, resulting in the separation of styrene phase from water phase. The comparison of the resin granules (L) with resin granules (M) revealed properties shown in the Table 2 given below.

TABLE 2

| | L | M |
|---|---|---|
| 1 Days required for preservation of resin granules until cells of prefoamed resin became fine and close. | 0 | 7 |
| 2 Cells in section of resin granules foamed after kept at 30°C | fine and close | very coarse |
| 3 Cells in section of resin granules foamed after preservation for 7 days at 30+C | fine and close | fine and close |
| 4 Cells in section of resin granules foamed after kept for 7 days at 10°C and then for 1 day at 30°C | fine and close | coarse |
| 5 Condition of resin granules pre-foamed | resin granules were separate | Blocking of resin granules took |
| 6 Time (minute) required for cooling a die to a temperature at which a molding of 60×90×50 cm made of resin granules of 7-10 mesh can be taken out from the die. | 15 | 35 |

EXAMPLE 3

The following aqueous solution and styrene mixture were placed in a 1,500 liters autoclave equipped with an agitator to start polymerization at about 90°C: 160 parts of aqueous solution containing 0.1 part of sodium tripolyphosphate, 0.2 part of sodium sulfate, 0.003 part of sodium nitrite and a small amount of dispersing agent; and 100 parts of styrene mixed with 0.2 part of hexamethylene bisstearamide, 0.32 parts of benzoyl, 0.03 part of perbenzoic acid-t-butyl and 0.1 part of stearic acid amide. 0.3 part of polyvinyl alcohol was added to the autoclave 5 hours and 50 minutes after the beginning of polymerization. Twenty minutes later, the following compounds were added to the polymerization system to be heated to about 100°C and kept at the temperature for about 5 hours: 0.7 part of n-pentane, 0.7 part of n-pentane and 9.3 parts of n-butane.

After cooling, the resulting granules were taken out to be dried, and preliminarily foamed immediately with steam of 100°C. Cells in the section of the foamed resin granules were fine, close and uniform. To the contrary, cells in section of foamed resin granules, to which hexamethylene, bisstearamide or tripolyphosphate were not added, were coarse.

EXAMPLE 4

The following solution and substance were placed in an autoclave equipped with an agitator to perform polymerization in nitrogen atmosphere at about 90°C: 160 parts of aqueous solution containing 0.3 part of polyvinyl alcohol, and 0.5 part of potassium sulfate; 100 parts of styrene in which compounds as given below were dissolved or dispersed: 0.32 part of benzoyl peroxide, 0.05 part of perbenzoic acid-t-butyl, 0.4 part of ethylene bisstearic acid amide and 0.2 part of stearic acid. One hour and 40 minutes after the beginning of polymerization, aqueous solution containing a small amount of polyvinyl pyrrolidone was added to the autoclave. Three hours and fifty minutes later, 0.3 part of polyvinyl alcohol and 10 parts of water were added to the polymerization system. Thirty minutes later, 9% of butane were introduced into the autoclave during 30 minutes. The polymerization system in the autoclave was heated up to about 100°C during 1 hour, and kept out the resulting resin granules. When the resin granules were preliminarily foamed immediately after being dried, the foamed granules did not cause blocking and cells in a section of the granules were very fine. When other resin granules were foamed after being exposed to the temperature of 35°C, cells in a section of the foamed granules were also fine.

When resin granules to which ethylene bisstearic acid amide were not added, but were foamed preliminarily immediately after being dried, cells in a section of the resin granules were too coarse to be used as commercial products.

EXAMPLE 5

The following liquid and compounds were placed in a 2-liter flask and kept at about 90°C for 6 hours and about 100°C for 5 hours: 100 parts of styrene, 0.2 part of methylene bisstearic acid amide and 0.3 part of benzoyl peroxide, 0.05 part of perbenzoic acid-t-butyl as catalyst, 0.2 part of palmitic acid, 0.5 part of sodium chloride and 0.1 part of sodium tripolyphosphate as dispersing agent and 160 parts of water. As a result, resin granules were obtained. 100 parts of the resulting resin granules and 200 parts of water were placed in a pressure container together with 0.3 part of polyvinyl alcohol and 10 parts of butane to impregnate the former with the latter for 6 hours at about 90°C. When the obtained resin granules were preliminarily foamed with steam of 100°C immediately, cells in a section were fine. The diameter of these cells was 50–70 μ.

When resin granules, to which ethylene bisstearic acid amide were not added, was foamed immediately after preparation, cells in a section of the resin granules were very coarse. When said resin granules were foamed after they were kept for 3 days, the mesh of cells in a section was 120–140 μ.

The foregoing description is intended to illustrate the principles of this invention. Numerous variations and modifications thereof would be apparent to one skilled in the art. All such variations and modifications are to be considered within the spirit and scope of this invention.

What is claimed is:

1. Process for preparing foamable synthetic resin comprising the steps of
   suspension polymerizing styrene, styrene derivative or monomer mixtures of 50% by weight or more of styrene,
   adding fatty acid bisamide of the formula

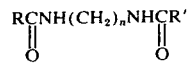

where R and R' are alkyl group, and $n$ is an integer from 1 to 6, to the polymerization system prior to polymerization or before the polymerization has proceded 15% of said polymerization step in the presence of a suspension agent, an initiator and inorganic salt selected from the group consisting of sodium tripolyphosphate, potassium sulfate and sodium sulfate, and
   adding at least a normally gaseous foaming agent to said polymerization system at a late stage of polymerization or after completion of polymerization.

2. Foamable synthetic resin granules produced by the process of claim 1.

3. Process of claim 1, wherein said monomers are selected from the group consisting of methyl acrylate, butyl acrylate, acrylonitrile, methacrylonitrile, butadiene and mixtures thereof.

4. Process of claim 1, wherein said foaming agent is an aliphatic hydrocarbon selected from the group consisting of ethane, propane, butane, isobutane, freon, dimethyl ether, methyl chloride and mixtures thereof.

5. Process of claim 1, wherein said fatty acid bisamide is added in an amount ranging from 0.01 to 3.0 weight percent.

6. Process of claim 5, wherein said fatty acid bisamide is selected from the group consisting of bislauric acid amide, ethylene acid amide, ethylene bisoleic acid amide, methylene bisstearamide and hexamethyl bisstearamide.

7. Process of claim 1, wherein said fatty acid bisamide is added to said polymerization system when it is polymerized about 10% or less.

8. Process of claim 1, wherein said foaming agent is added to said polymerization when said polymerization was 90% or more complete.

9. Process of claim 1, wherein said fatty acid bisamide is used together with a higher fatty acid containing 12–24 carbon atoms.

10. Process of claim 9, wherein said higher fatty acid is selected from the group consisting of lauric acid, palmitric acid, myristic acid, stearic acid and oleic acid.

11. Process of claim 1, wherein said alkyl group contains 7–23 carbon atoms.

12. Process of claim 1, wherein 0.3 parts of said fatty acid bisamide is added to 100 parts of styrene in said polymerization system.

13. Process of claim 1, wherein the temperature of polymerization ranges from 90° to 100°C, and in an atmosphere of nitrogen or air.

* * * * *

UNITED STATES PATENT OFFICE
CERTIFICATE OF CORRECTION

Patent No. 3,960,787          Dated June 1, 1976

Inventor(s) Hiroji Tsukamoto; Hisashi Morikawa; Masao Nakagawa **

It is certified that error appears in the above-identified patent and that said Letters Patent are hereby corrected as shown below:

The name "Hiroji Isukamoto" is changed to --Hiroji Tsukamoto--. This amendment occurs twice on the cover page.

Signed and Sealed this

Twenty-seventh Day of July 1976

[SEAL]

Attest:

RUTH C. MASON
*Attesting Officer*

C. MARSHALL DANN
*Commissioner of Patents and Trademarks*